US011265211B1

United States Patent
Nelson et al.

(10) Patent No.: US 11,265,211 B1
(45) Date of Patent: Mar. 1, 2022

(54) CONTINUOUS DELIVERY OF MANAGEMENT CONFIGURATIONS

(71) Applicant: VMware, Inc., Palo Alto, CA (US)

(72) Inventors: Mike Nelson, Atlanta, GA (US); Josue Negron, Dallas, TX (US)

(73) Assignee: VMWARE, INC., Palo Alto, CA (US)

(*) Notice: Subject to any disclaimer, the term of this patent is extended or adjusted under 35 U.S.C. 154(b) by 0 days.

(21) Appl. No.: 17/221,025

(22) Filed: Apr. 2, 2021

(51) Int. Cl.
*H04L 12/24* (2006.01)
*H04L 41/0813* (2022.01)
*H04L 41/50* (2022.01)
*H04L 41/22* (2022.01)
*H04L 41/14* (2022.01)

(52) U.S. Cl.
CPC ........ *H04L 41/0813* (2013.01); *H04L 41/145* (2013.01); *H04L 41/22* (2013.01); *H04L 41/50* (2013.01)

(58) Field of Classification Search
CPC . H04L 41/08; H04L 41/0803; H04L 41/0813; H04L 41/082; H04L 41/14–147; H04L 41/22
See application file for complete search history.

(56) References Cited

U.S. PATENT DOCUMENTS

| | | | |
|---|---|---|---|
| 6,225,998 B1* | 5/2001 | Okita | G06F 8/34 707/999.102 |
| 2009/0106424 A1* | 4/2009 | Safari | H04L 47/70 709/226 |
| 2015/0222723 A1* | 8/2015 | Adapalli | G06Q 10/067 705/26.41 |
| 2018/0048521 A1* | 2/2018 | Nair | G06F 9/44589 |
| 2019/0028360 A1* | 1/2019 | Douglas | G06F 9/45512 |
| 2020/0183679 A1* | 6/2020 | Hashimoto | H04L 41/14 |
| 2020/0186424 A1* | 6/2020 | Hashimoto | H04L 41/28 |
| 2021/0266228 A1* | 8/2021 | Reehil | H04L 41/0654 |

* cited by examiner

*Primary Examiner* — Brendan Y Higa
(74) *Attorney, Agent, or Firm* — Thomas Horstemeyer, LLP (57) ABSTRACT

Disclosed are various implementations of approaches for continuous delivery of management configurations. In some examples, a management configuration delivery workflow is identified. A management console user interface includes a graphical representation of the management configuration delivery workflow. The management configuration is retrieved from a source environment specified in the management configuration delivery workflow and transmitted to a specified destination environment.

20 Claims, 5 Drawing Sheets

CONTINUOUS DELIVERY OF MANAGEMENT CONFIGURATIONS

BACKGROUND

Enterprises can manage configurations and compliance of enterprise components that are used for enterprise productivity and have access to enterprise resources. These components can include individual devices, as well as infrastructure, software, and other products that can be provided as a service. Datacenters often organize groups of computers into clusters. Clusters of computers can be used to host applications in a coordinated, yet distributed manner.

Enterprises may desire to update their management configurations, for example, in response to changing work conditions and security considerations. Updating management configurations can involve multiple different and separate computing environments that are not readily integrated or communicatively coupled. Even where a common network connection exists, the various environments can lack authorization to communicate with one another, among other integration hurdles. The end user environments can also be separate from development, testing, and other preliminary environments.

Existing technologies can require manual re-entry of all configurations and settings in each environment. These processes can be time consuming and error-prone. As a result, there is a need for improved handling of management configurations from development to testing to end use.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to continuous delivery of management configurations. Updating management configurations can involve multiple separate computing environments that are not readily integrated or communicatively coupled in current systems. Even where a common network connection exists, the various environments can lack authorization to communicate with one another, among other integration hurdles. The end user environments can also be separate from development, testing, and other preliminary environments. Existing technologies can require manual re-entry of all configurations and settings in each environment. However, the present disclosure provides mechanisms that enable continuous delivery of management configurations between otherwise separate environments.

Figure 1:
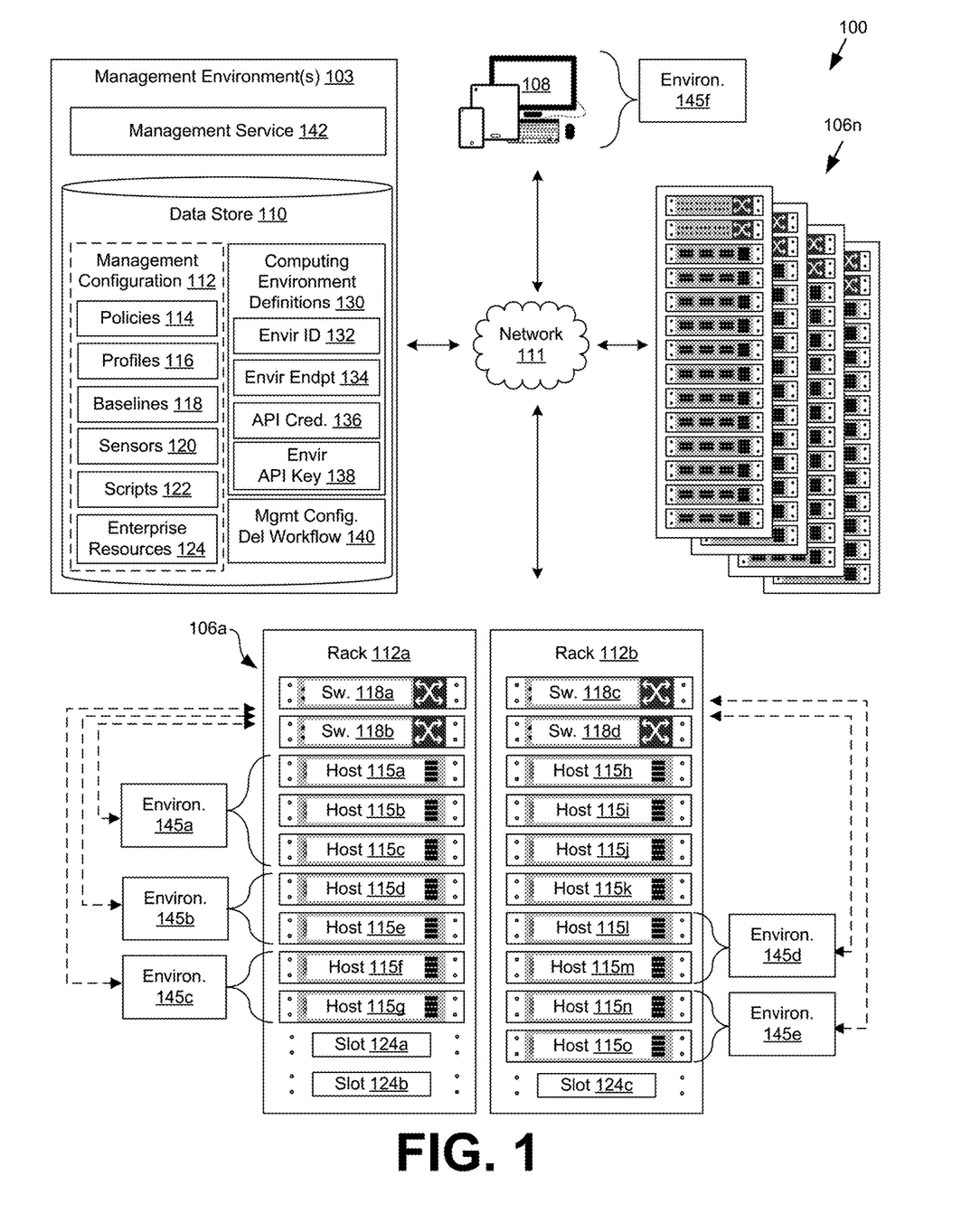
FIG. 1 is a drawing of an example of a networked environment capable of continuous delivery of management configurations.

With reference to FIG. 1, an example of a networked environment 100 is shown. The networked environment 100 can include a management environment 103, various computing sites 106a . . . 106n, and one or more client devices 108 in communication with one another over a network 111. The network 111 can include wide area networks (WANs) and local area networks (LANs). These networks can include wired or wireless components, or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 111 can also include a combination of two or more networks 111. Examples of networks 111 can include the Internet, intranets, extranets, virtual private networks (VPNs), and similar networks. As the networked environment 100 can serve up virtual desktops to end users, the networked environment 100 can also be described as a virtual desktop infrastructure (VDI) environment.

In various embodiments, the computing sites 106 can include a plurality of devices installed in racks 112, such as racks 112a and 112b, which can make up a server bank, aggregate computing system, or a computer bank in a data center or other like facility. In some examples, a computing site 106 can include a high-availability computing site 106. A high-availability computing site 106 is a group of computing devices that act as a single system and provide a continuous uptime. The devices in the computing sites 106 can include any number of physical machines, virtual machines, virtual appliances, and software, such as operating systems, drivers, hypervisors, scripts, and applications.

In some examples, the management environment 103 can include an enterprise computing environment that includes hundreds or even thousands of physical machines, virtual machines, and other software implemented in devices stored in racks 112, distributed geographically and connected to one another through the network 111. It is understood that any virtual machine or virtual appliance is implemented using at least one physical device.

The devices in the racks 112 can include, for example, memory and storage devices, host devices 115a . . . 115o, switches 119a . . . 119d, and other computing or network devices. These devices can include graphics cards containing graphics processing units (GPUs), central processing units (CPUs), power supplies, network interfaces, memory, storage, and similar devices. The devices, such as host devices 115 and switches 119, can have dimensions suitable for quick installation in slots 124, such as slots 124a . . . 124c, on the racks 112. In various examples, the host devices 115 can include requisite physical hardware and software to create and manage a virtualization infrastructure. The physical hardware for a host device 115 can include a CPU, graphics card, data bus, memory, and other components. In some examples, the host devices 115 can include a preconfigured, hyper-converged computing device where a hyper-converged computing device includes pre-tested, preconfigured, and pre-integrated storage, server and network components, including software, that are positioned in an enclosure installed in a slot 124 on a rack 112.

Additionally, if a host device 115 includes an instance of a virtual machine, the host device 115 can be referred to as a "host," while the virtual machine can be referred to as a "guest." Each host device 115 that acts as a host in the networked environment 100, and thereby includes one or more guest virtual machines, can also include a hypervisor. In some examples, the hypervisor can be installed on a host device 115 to support a virtual machine execution space within which one or more virtual machines can be concurrently instantiated and executed. In some examples, the hypervisor can include the VMware ESX™ hypervisor, the VMware ESXi™ hypervisor, or similar hypervisor. It is understood that the computing sites 106 or datacenters are scalable, meaning that the computing sites 106 in the networked environment 100 can be scaled dynamically to include additional host devices 115, switches 119, and other components, without degrading performance of the virtualization environment. Moreover, the additional host devices 115 and switches 119 need not be located in the same rack 112 or the same facility. For example, a computing site 106 could be formed from a collection of host devices 115 and switches 119 located in multiple racks 112 positioned in one or more data centers. In some examples, the hosts in the computing site 106 are monitored and, in the event of a failure, the virtual machines or virtual appliances on a failed host are restarted on alternate hosts.

In various examples, when a host device 115 (e.g., a physical computing device) is added to a computing site 106, an agent application can be uploaded to the host and configured to communicate with other agent applications in the computing site 106. Some of the hosts in the computing site 106 can be designated as primary hosts, and other hosts in the computing site 106 can be designated as secondary hosts. The primary hosts, for example, can maintain and replicate states of the computing site 106 and can be used to initiate failover actions. Any host that joins the computing site 106 can communicate with a host, such as an existing primary host, to complete its configuration.

The management environment 103 can include, for example, a host device 115 or any other system providing computing capability. Alternatively, the management environment 103 can include one or more computing devices that are arranged, for example, in one or more server banks, computer banks, computing clusters, or other arrangements. The management environment 103 can include a grid computing resource or any other distributed computing arrangement. The computing devices can be located in a single installation or can be distributed among many different geographical locations. Although shown separately from the computing sites 106, it is understood that in some examples the computing sites 106 can provide, or be integrated with the management environment 103.

The management environment 103 can include or be operated as one or more virtualized computer instances. For purposes of convenience, the management environment 103 is referred to herein in the singular. Even though the management environment 103 is referred to in the singular, it is understood that a plurality of management environments 103 can be employed in the various arrangements as described above. As the management environment 103 communicates with the computing sites 106 and client devices 108 for end users over the network 111, sometimes remotely, the management environment 103 can be described as a remote management environment 103 in some examples. Additionally, in some examples, the management environment 103 can be implemented in host devices 115 of a rack 112 and can manage operations of a virtualized computing environment. Hence, in some examples, the management environment 103 can be referred to as a management cluster for the computing sites 106.

The management environment 103 can include a data store 110. The data store 110 can include memory of the management environment 103, mass storage resources of the management environment 103, or any other storage resources on which data can be stored by the management environment 103. The data store 110 can include memory of the host devices 115 in some examples. In some examples, the data store 110 can include one or more relational databases, object-oriented databases, hierarchical databases, hash tables or similar key-value data stores, as well as other data storage applications or data structures. The data stored in the data store 110, for example, can be associated with the operation of the various services or functional entities described below.

Various applications can be executed on the management environment 103. For example, a management service 142 can be executed by the management environment 103. Although the functionality provided by the management service 142 is discussed as being provided by a single service, the functionality attributed to the management service 142 can be split across multiple applications or services. For example, some of the functionality attributed to the management service 142 might be implemented by a first application or process, while other functionality might be implemented by other applications or processes. Other applications, services, processes, systems, engines, or functionality not discussed in detail herein can also be executed or implemented by the management environment 103.

The management service 142 can generate a management console or other administrative user interface for administration of management configurations 113 and management configuration delivery workflows 140. For example, the management service 142 can provide a user interface to create and modify management configurations 113, environments 145, as well as management configuration delivery workflows 140.

Further, various physical and virtual components of the computing sites 106 can process workloads using workload domains and environments 145$a$ . . . 145$f$, which can include a defined logical set of hardware that combines compute, storage, and networking into a single consumable entity. The hardware can be provided using storage, compute, and network devices of the host devices 115, switches 119, and other physical or virtual components of a computing site 106 that has been instructed to process or route at a given time. Individual environments 145 can be spread across multiple host devices 115 within one or more computing sites 106, and a computing site 106 can be assigned multiple environments 145. The environments 145 can be associated with virtual machines or other software executing on the host devices 115 in association with an enterprise. The environments 145 can also include a physical set of hardware defined by one or more client devices 108 that are utilized by the enterprise.

An environment 145, such as a client device 108 can be readily understood to be separate from an environment 145 provided by a computing site 106. However, two or more environments 145 hosted on the same rack 112 can also be understood to be separate from one another. Each environment 145 can include its own separately-defined set of hardware (and software) resources. For example, the resources of one environment 145 can be mutually exclusive from the resources of another environment 145. Each environment 145 can have access to its set of resources as local devices, whether the physical components are locally or remotely located.

The data store 110 can include a data store of the management environment 103. The data store 110 can include a management configuration 113, policies 114, profiles 116, baselines 118, sensors 120, scripts 122, enterprise resources 124, computing environment definitions 130, environment identifiers 132, environment endpoints 134, environment Application Programming Interface (API) credentials 136, environment API keys 138, management configuration delivery workflows 140, and other data.

The management configuration 113 can refer to a set of management or compliance settings. The management configuration 113 can include a set of one or more of the policies 114, profiles 116, baselines 118, sensors 120, scripts 122, and enterprise resources 124.

The policies 114 can include legacy and group policies 114. Policies 114 can be enforced by management components, agents, and other instructions executed by a virtual or physical device of an environment 145. In some cases, the policies 114 can be enforced using an operating system. Kernel-space and/or user-space management components, agents, and other instructions can directly enforce or use an operating system to enforce settings and parameters associated with the policies 114.

The profiles 116 can include configuration service provider (CSP) based profiles 116. A CSP can refer to a set of instructions or an interface that is capable of reading, setting, modifying, and deleting configuration settings. These settings can map to registry keys, files, and other aspects of a virtual or physical device or system including virtual machines, virtual desktops, and client devices 108. A CSP can be provided with Windows® 10 or another operating system, as well as third-party or other management components, and can change states specified by a profile 116. Kernel-space and/or user-space management components, agents, and other instructions can directly enforce or use an operating system to enforce settings and parameters associated with the profiles 116.

The baselines 118 can include security baselines and types of baselines. In some cases, the baselines 118 can include a customized set of policies 114 and profiles 116 corresponding to the baseline type. For example, a security baseline can include a set of security policies 114 and security profiles 116. A management console of the management service 142 can include a user interface through which policies 114 and profiles 116 can be added to a baseline 118. A generalized baseline can include any set of policies 114 and profiles 116.

The sensors 120 can include a type of script 122 or other instructions configured to detect and report a configuration, setting, value, or another parameter of an environment 145. This can include registry key values, other data values for a specified data location, processor temperature, fan speed, usernames, installed operating system identifiers and versions, installed application identifiers and versions, cursor position, connected peripheral device identifiers, and so on. The sensors 120 can be executed to detect and transmit these parameters to a specified endpoint of a management service 142 or another network service, a single time, on demand, periodically, and on a schedule.

The scripts 122 can include executable instructions to perform actions on an environment 145. The scripts 122 can be executed to perform the action and transmit a result of the action to a specified endpoint of management service 142 or another network service, a single time, on demand, periodically, and on a schedule. Scripts 122 can include instructions to perform command line commands, for example, using a command-line shell and scripting language. This can include PowerShell scripts and commands using a .NET Common Language Runtime (CLR), as well as UNIX shell scripts. A script 122 can include commands that accept and return objects with respect to the environment 145. The enterprise resources 124 can include files, data, applications, certificates, keys, and other data that is accessed for enterprise purposes.

The computing environment definitions 130 can include data that describes and identifies an environment 145. For example, an environment 145 can be associated with an environment identifier 132, one or more environment URLs or environment endpoints 134, environment API credentials 136, and an environment API key 138.

The environment identifier 132 can include a name, a string, a file, a parameter, or another identifier of the environment. The environment endpoint 134 can include a URL or a URL of the environment 145. This can include a communications endpoint such as an API endpoint. The environment API credentials 136 can include a username and password, a certificate, and other credentials associated with a user account that has an access level or permissions that has read/write permissions for the environment endpoint 134 or associated API of the environment 145.

The environment API key 138 can include a key generated by the management service 142 or the environment 145 to provide access to an API endpoint of the environment 145. In some examples, the environment API key 138 can be associated with an 'administrator' type or another type of access level or permissions. The environment API key 138 can be associated with a user account that has an access level or permissions that has read/write permissions for the environment endpoint 134 of the environment 145.

The management configuration delivery workflow 140 can specify a particular management configuration 113, policy 114, profile 116, baseline 118, sensor 120, script 122, or enterprise resource 124 package, as well as a set of environments 145 used for a development and deployment lifecycle for the management configuration 113. The management configuration 113, policy 114, profile 116, baseline 118, sensor 120, script 122, or enterprise resource 124 package, can be specified using a corresponding identifier. The management configuration delivery workflow 140 can include a computing environment definition 130 for each environment of the set of environments 145 as well as a delivery path performed sequentially, in parallel, and with partial concurrence. The total set of environments 145 can include a delivery path with delivery steps performed sequentially, in parallel, and with partial concurrence. Each delivery step can include a specified environment status condition such as success or failure. Automated environments 145 can be instructed to perform a task and return a parameter to the management service 142 that indicates a result of the status condition. Manual or user-operated environments 145 can include user instructions to specify the result of the status condition. In some examples, the management configuration delivery workflow 140 can cause the environment 145 to provide a user interface element through which the user can specify the result of the status condition and transmit it to the management service 142. In other cases, success can be defined as a lack of crashes and lack of support tickets and error reports received from the environment 145 for a specified period of time.

The set of environments 145 can include a development or another source environment 145 where the current or most updated version of the management configuration 113 can be retrieved, one or more test environments 145 that test various aspects of the management configuration 113, and one or more production environments 145. In some cases, there can be multiple source environments for the various policies 114, profiles 116, baselines 118, sensors 120, scripts 122, or enterprise resources 124 of the management configuration 113. The test environments 145 can include a testing delivery path that can include delivery steps performed sequentially, in parallel, and with partial concurrence, each delivery step having a specified status condition such as a manually provided or automatically detected indication of success or failure.

Test environments 145 can include automated test environments 145 that automatically analyze the management configuration 113 or a specified portion of the management configuration 113 using a software package such as a test and validation suite that confirms operability of the management configuration 113 or a specified portion of the management configuration 113. Test environments 145 can also include manual test environments 145 that instruct a test user to test a management configuration 113 or specified portion of the management configuration 113. The management configuration delivery workflow 140 can include text, audio, and video instructions that indicate aspects of the management configuration 113 to test, and manual instructions for how to perform the test. The changes between a current version and a previous version of the management configuration 113 can also be specified on delivery to the manual test environment 145.

The management service 142 can automatically identify differences between a current management configuration 113 and a previous management configuration 113. The management service 142 can show these changes in a management console. The management service 142 can use the identified differences to automatically instruct an automated test environment 145 to perform a particular set of executable instructions, actions, or test suite. The management service 142 can identify that a value for a property or parameter of the current management configuration 113 has been updated from a previous value for that parameter in the previous management configuration 113. The management service 142 can map the parameter or property to a particular set of instructions, actions, or test suite, and automatically configure an automated test environment 145 to perform the set of executable instructions, actions, or test suite. For example, the management service 142 can transmit a command for the test environment 145 to install an application or other executable instructions to perform the test. The command can be transmitted along with the executable instructions, or can specify a network address from which the executable instructions or application can be downloaded and installed.

The management service 142 can map the parameter or property to a particular set of manual instructions, and provide the manual instructions to a manual test environment 145 along with the differences between the current and previous management configurations 113. The management service 142 can use an instructions mapping stored in the data store 110 to identify the instructions.

The management service 142 can also provide recommendations or automatically update a management configuration delivery workflow 140 based on the differences that are identified and hardware resources and environments 145 that are available. For example, if multiple differences are found, the management service 142 can recommend or automatically implement a modification that tests one or more differences in a first environment 145, and concurrently tests other differences in a second environment 145. This can improve the speed of deployment.

Production environments 145 can include environments 145 that are used by the intended end user of the management configuration 113. The management configuration delivery workflow 140 can specify a multi-stage roll out of the management configuration 113 to multiple production environments 145 corresponding to specified user groups of user accounts with the management service 142. For example, an administrative group, an information technology group, or any subset of users can receive an updated and tested management configuration 113 initially. The management service 142 can monitor the operation of the initial production environment(s) 145. If the client devices 108 and/or other initial environments 145 experience fewer than a threshold level of crashes, support tickets, and error reports associated with the updated management configuration 113 over a specified period of time, then the management configuration 113 can be delivered to the next production environment(s) 145 specified by the management configuration delivery workflow 140.

Figure 2:
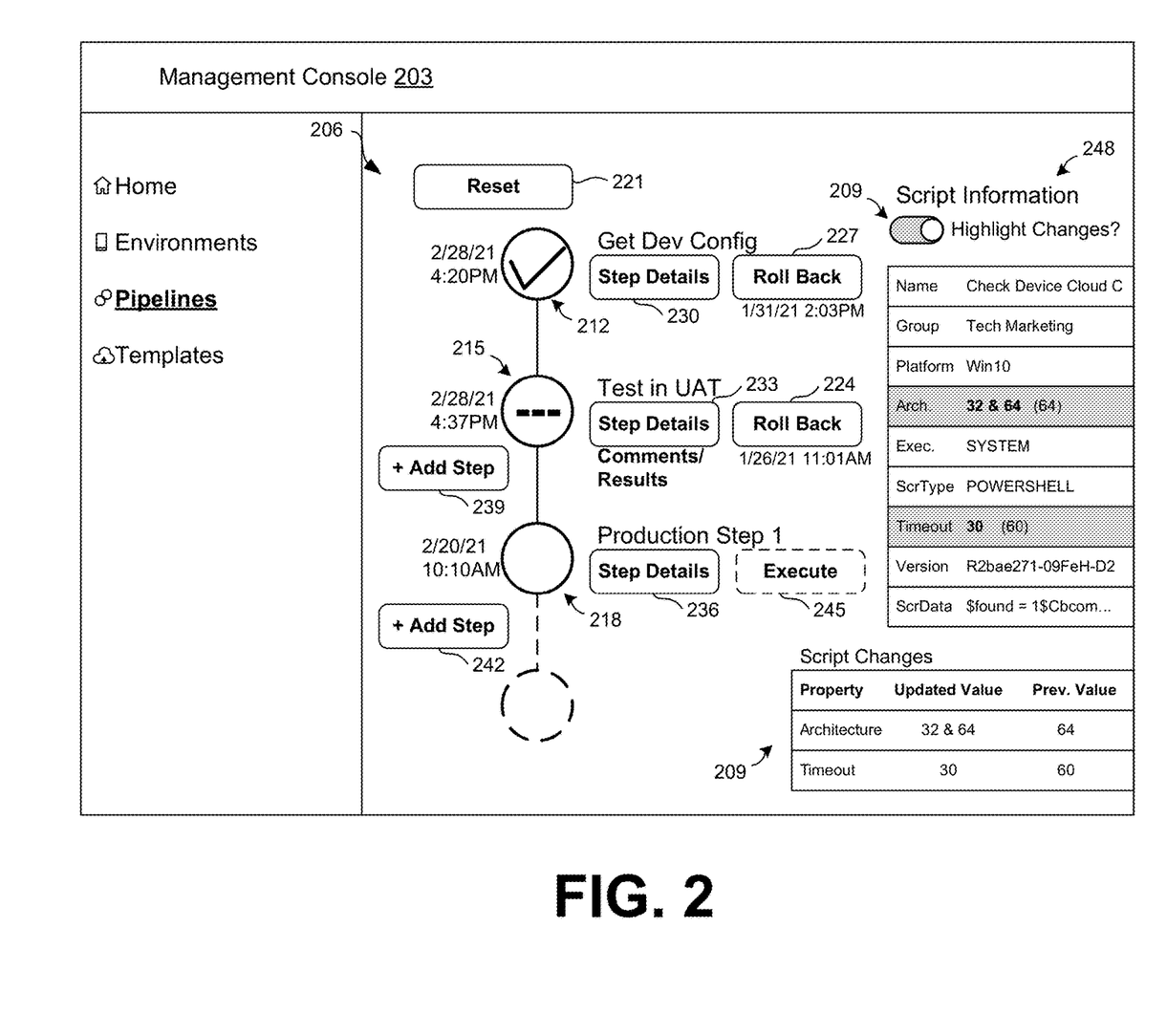
FIG. 2 is a drawing illustrating an example user interface for continuous delivery of management configurations using components of the networked environment.

Proceeding to FIG. 2, shown is an illustration of an example management console 203 generated by the management service 142. The management console 203 can include a workflow or pipeline creation user interface 206 that enables an administrative user to create, modify, and execute a management configuration delivery workflow 140 for a management configuration 113.

The management configuration delivery workflow 140 can include steps or nodes 212, 215, and 218. The user interface 206 can include a button or user interface element 221 that can reset the management configuration delivery workflow 140. For example, the user interface element 209, when selected, can cause the management service 142 to stop all automated environments 145 corresponding to steps 212, 215, and 218. The management service 142 can also instruct users of manual environments 145 corresponding to steps 212, 215, and 218 that the management configuration delivery workflow 140 has been reset and to stop work on the current management configuration 113.

The user interface 206 can also include user interface elements 209 and 212 that can roll back individual steps or nodes of the management configuration delivery workflow 140. For example, the user interface element 224, when selected, can roll back node 215 of the management configuration delivery workflow 140. This can include stopping the automated environments 145, providing instructions for manual environments 145, uninstalling a current version of the management configuration 113 and reinstalling a previous version of the management configuration 113. In some cases, a roll back scenario can generate instructions for the source or development environment 145 that indicates that a roll back has been performed, and a reason for the roll back. A failure can also generate instructions for the source or development environment 145 that indicates failure, and a reason for the failure. In some example, a failure can automatically trigger a roll back. The user interface element 227, when selected, can roll back node 212 of the management configuration delivery workflow 140. The user interface 206 can be updated to reflect a current state of the management configuration delivery workflow 140, including roll backs, failures, successful steps, and other information. The management console 203 can present more detailed information regarding the successes, failures, roll backs, and other information for each node of the management configuration delivery workflow 140 in response to selection of the user interface elements 230, 233, and 236.

The user interface 206 can include a user interface element 239 to add a node relative to node 215. When selected, the user interface element 239 can cause the management service 142 to add a node to the management configuration delivery workflow 140 parallel to node 215, between node 215 and node 218, or otherwise with sequential, parallel, or partial concurrence relative to node 215.

The user interface 206 can include a user interface element 242 to add a node relative to node 218. When selected, the user interface element 242 can cause the management service 142 to provide an overlay, side panel, or other user interface to add a node to the management configuration delivery workflow 140 parallel to node 218, after node 218, or otherwise with sequential, parallel, or partial concurrence relative to node 218. A user can enter, select, or otherwise specify an environment identifier 132, a name, and a description, and additional specifications for the node or step.

The user interface 206 can provide visual status information through the graphical representation of the nodes of the management configuration delivery workflow 140. For example, the user interface 206 can include a check mark or other icon, and/or a color within the node 212 that indicates that node 212 was successfully performed. The user interface 206 can include a time and date of successful completion or initiation of the node 212. The user interface 206 can include an ellipsis, a set of dashes, an icon, an animation, and/or a color within the node 215, indicating that node 215 was initiated and is in progress. The user interface 206 can include a time and date of the initiation of node 215.

The management console 203 can update user interface elements and information shown in the user interface 206 based on progress, success, failure, and manual roll backs of the management configuration delivery workflow 140. For example, an 'execute' user interface element 245 for node 218 can be hidden, shaded, partially transparent, and inoperable until node 215 is completed. In some cases, no manual button is required, and steps or instructions for node 218 can be initiated automatically or within a threshold time after the successful completion of node 215.

The user interface 206 can also identify and highlight changes between a current management configuration 113 and a previous management configuration 113. In the example shown, the management configuration 113 can include or correspond to a script 122. The management service 142 can automatically identify the changes between a management configuration 113 retrieved at node 212, and a previous version of the management configuration 113. A configuration information user interface area 248 can provide technical information including parameters of the current management configuration 113. The configuration information user interface area 248 can highlight or otherwise visually emphasize changes or differences between the current version and previous versions using a text color, shade, typeface, and formatting, as well as a background color or shade. The configuration information user interface area 248 can use corresponding typefaces and other formatting to distinguish current parameters of the current version from previous parameters of the previous version. A configuration information user interface area 248 can include a truncated set of information from the configuration information user interface area 248 that is limited to changes or differences associated with the current version.

Figure 3:
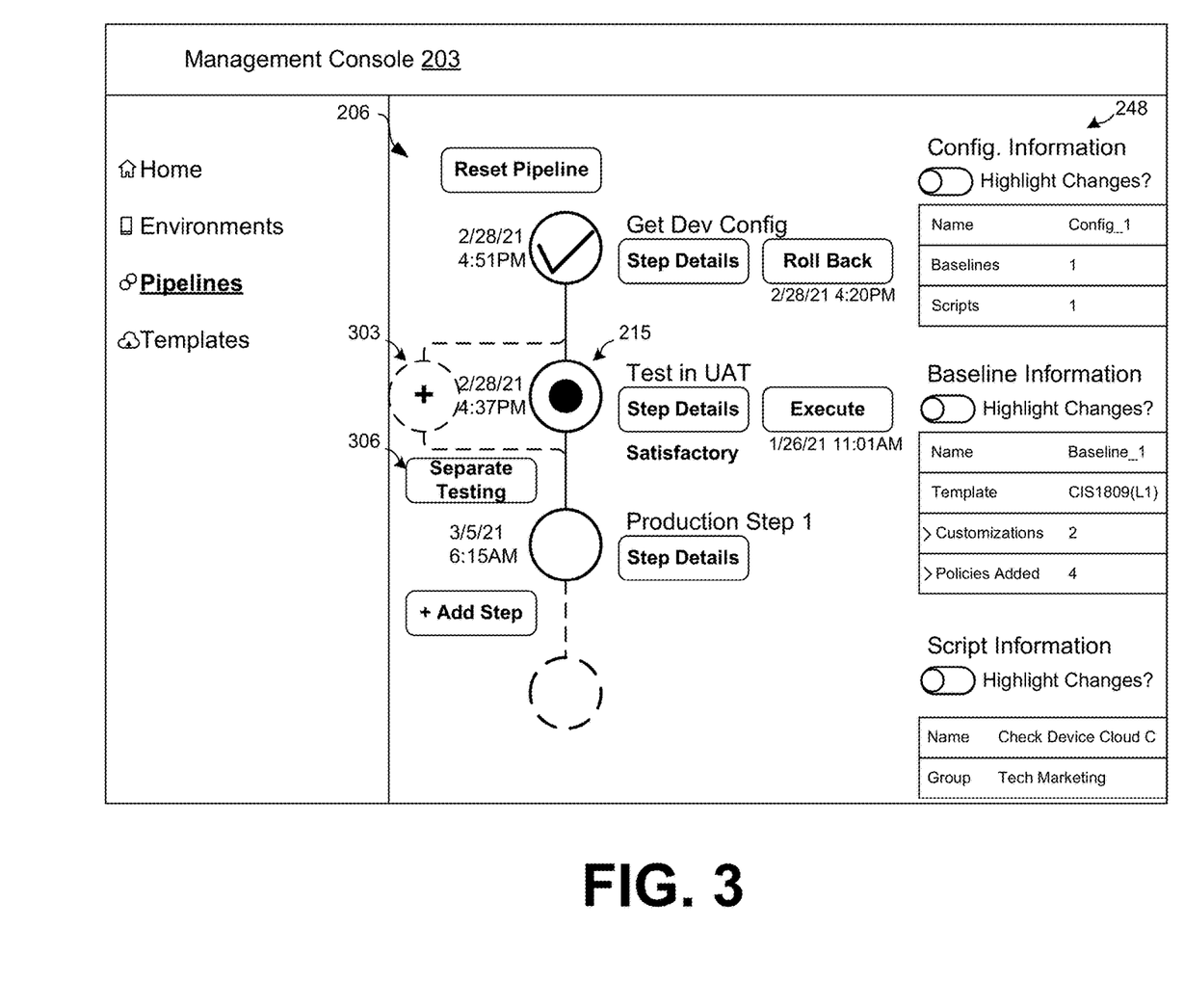
FIG. 3 is another drawing illustrating another example user interface for continuous delivery of management configurations using components of the networked environment.

FIG. 3 shows an illustration of another example of the management console 203 generated by the management service 142. FIG. 3 shows an example of how the management service 142 can provide recommendations and automatically update a management configuration delivery workflow 140 based on differences that are identified.

The management service 142 can automatically identify differences between a current management configuration 113 and a previous management configuration 113. The management service 142 can show these changes in the configuration information user interface area 248 of the management console 203. The management service 142 can identify that the current management configuration 113 includes a baseline 118 and a script 122, whereas the previous management configuration 113 included only a script 122. The management service 142 can determine that different configuration types such as baselines 118 and scripts 122 are mapped to different types of tests, or different manual and automatic instructions. The management service 142 can then generate a recommended node 303 as a modification to the management configuration delivery workflow 140 to separate testing for the baseline 118 and the script 122. In other cases, parameters of the baseline 118 and parameters of the script 122 can be further separated to be separately tested. A user can select the node 303 or the user interface element 306 to implement separate testing. The existing node 215 can also be updated to automatically, or to manually test a particular change, rather than all of the changes. In other examples, the management service 142 can automatically implement changes to the management configuration delivery workflow 140. The management service 142 can also identify and recommend or automatically update to provide multiple separate development environments, multiple separate production steps, based on an analysis of hardware and personnel resources in view of the differences identified between previous and current management configurations 112.

Figure 4:
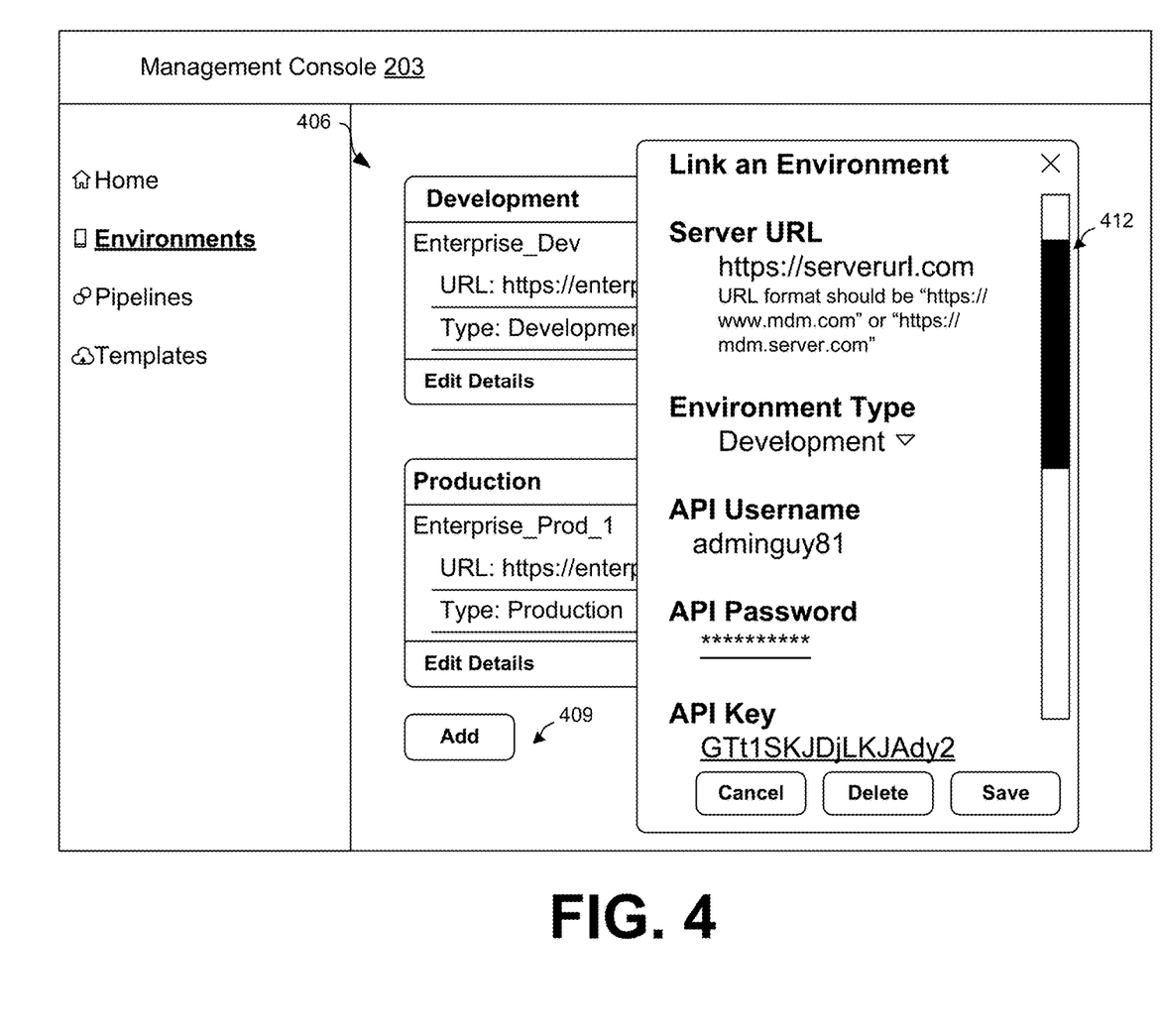
FIG. 4 is another drawing illustrating another example user interface for continuous delivery of management configurations using components of the networked environment.

FIG. 4 shows an illustration of another example of the management console 203 generated by the management service 142. FIG. 4 shows an example user interface 406 for configuring and linking an environment 145 for use in a management configuration delivery workflow 140.

The user interface 406 can also include a user interface element 409 to add an additional environment 145 for use in a management configuration delivery workflow 140. The management service 142 can update the management console 203 to include an overlay, pop-up, side panel, or another user interface area 412. The user interface area 412 can include user interface elements through which a user can enter, select, or otherwise specify aspects of the additional environment 145 corresponding to the computing environment definition for the environment 145. For example, a user can specify an environment endpoint 134 such as a URL, an environment type, API credentials 136 such as username and password, and an environment API key 138. An environment identifier 132 or name can also be specified. The user interface area 412 can also include textual instructions for how to specify each aspect of the environment 145, including formatting instructions, location instructions, and other information.

The user interface 406 can also include a number of tiles corresponding to environments 145 that have been configured for use in a management configuration delivery workflow 140. Each tile can include a user interface element that enables a user to edit the computing environment definition 130 for the corresponding environment 145.

Figure 5:
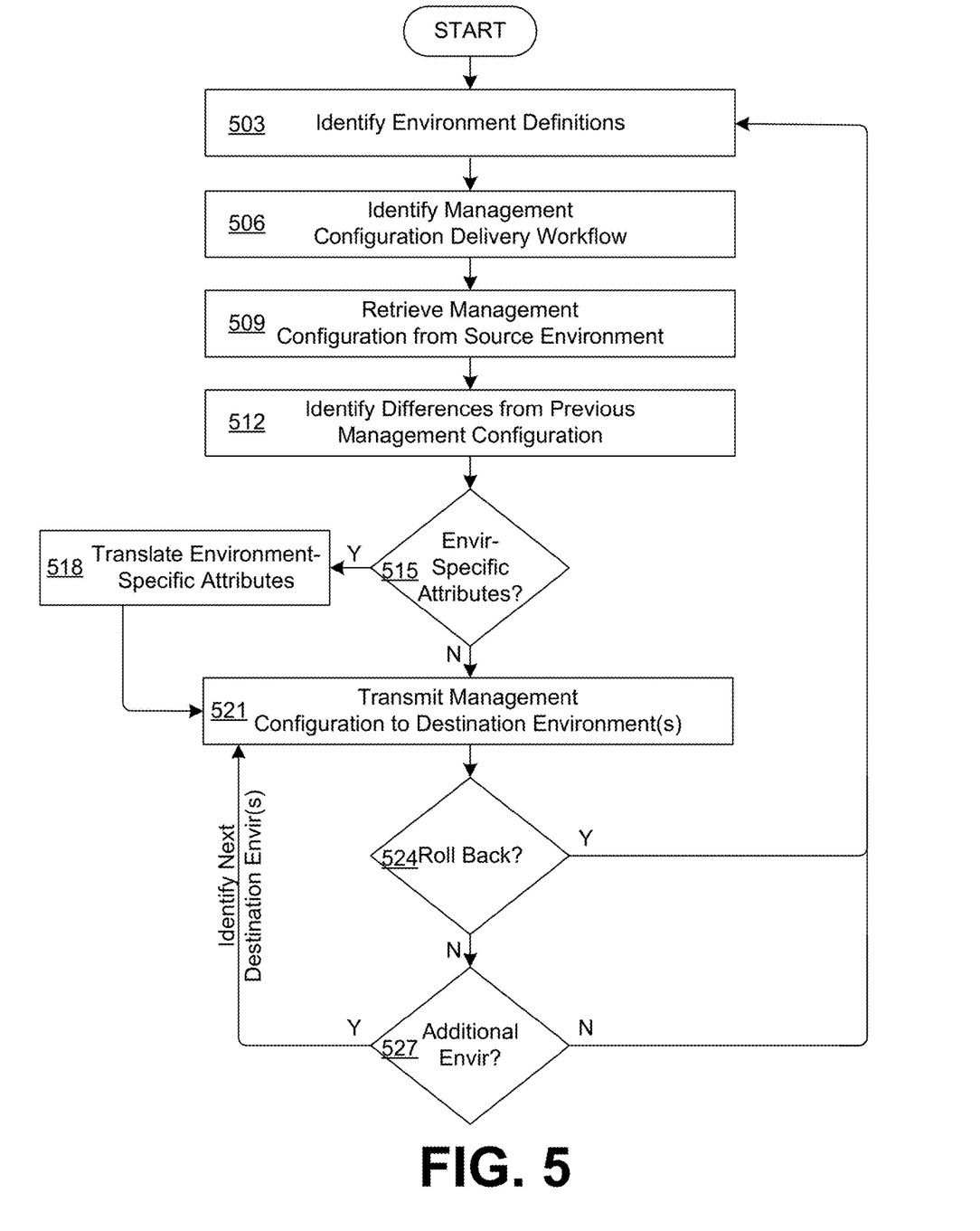
FIG. 5 is a flowchart that describes functionalities provided by components of the networked environment for continuous delivery of management configurations.

Moving on to FIG. 5, shown is a flowchart that provides one example of the operation of a portion of the networked environment 100. The flowchart of FIG. 5 can be viewed as depicting an example of elements of a method implemented by the management service 142, or by the management service 142 executing in the management environment 103, according to one or more examples. The separation or segmentation of functionality as discussed herein is presented for illustrative purposes only.

At step 503, the management service 142 can identify computing environment definitions 130. The computing environment definitions 130 can include data that describes and identifies an environment 145. For example, an environment 145 can be associated with an environment identifier 132, one or more environment URLs or an environment endpoint 134, environment API credentials 136, an environment API key 138, and other information about an environment 145.

The management service 142 can generate a management console or another administrative user interface through which an environment 145 can be created and implemented using hardware hosts and client devices 108. The management service 142 can manage and monitor a number of environments 145. The management service 142 can generate a management console or another user interface through which the environments 145 can be added for use in a management configuration delivery workflow 140. This can enable otherwise separate environments 145 to transfer a management configuration 113 according to the management configuration delivery workflow 140.

In step 506, the management service 142 can identify a management configuration delivery workflow 140. The management service 142 can generate a user interface through which a management configuration delivery workflow 140 can be created. For example, management service 142 can generate a user interface element through which a user can specify a source environment 145 for the management configuration delivery workflow 140, and a management configuration 113 to retrieve from the source environment 145. In some cases, the management configuration 113 does not need to be specified.

The management service 142 can configure and provide a tool or a data location within the source environment 145 that enables a developer to expose the management configuration 113 for use in the management configuration delivery workflow 140. Multiple different types of management configurations 113 can be provided through a single source environment 145. The management service 142 can configure and provide a tool or a data location within the source environment 145 for each management configuration 113 specified for any number of management configuration delivery workflows 140.

The management service 142 can recommend or automatically modify a management configuration delivery workflow 140 to include test environments 145 based on a management configuration 113 that is retrieved from the initial source environment 145. A user can accept recommendations and manually configure the management configuration delivery workflow 140 though the management console. Any number of environments 145 can be linked for development, testing, production, and any deployment purpose.

The management configuration delivery workflow 140 can include a computing environment definition 130 for each environment of the set of environments 145 as well as a delivery path performed sequentially, in parallel, and with partial concurrence. The total set of environments 145 can include a delivery path with delivery steps performed sequentially, in parallel, and with partial concurrence. Each delivery step can include a specified status condition.

At step 509, the management service 142 can retrieve a management configuration 113 from a source environment 145. The source environment 145 can be specified in the management configuration delivery workflow 140. In some cases, the management service 142 can update the management console to include a notification indicating that a management configuration 113 has been completed, specified using a tool, or stored in a specified data location for completed management configurations 113, within the source environment 145. The management service 142 can also retrieve the management configuration 113 automatically or in response to selection of an 'execute' user interface element within the management console.

The management service 142 can generate and transmit a request to retrieve the management configuration 113 using an environment endpoint 134, API credentials 136, and an environment API key 138 of the source environment 145. The management service 142 can identify and extract these items from the management configuration delivery workflow 140. The source environment 145 can authorize a request to retrieve the management configuration 113 based on the API credentials 136, and environment API key 138. The management service 142 can include the environment API key 138 in an authorization header for the request.

At step 512, the management service 142 can identify differences from a previous management configuration 113. The management configuration delivery workflow 140 can provide continuous delivery of management configurations 113 as updated management configurations 113 or updated versions of a particular management configuration 113 that are developed and provided by the source environment 145. The management service 142 can compare a previous management configuration 113 to a current management configuration 113. The management service 142 can use the comparison to identify a set of differences including added, removed, and modified policies 114, profiles 116, baselines 118, sensors 120, scripts 122, and enterprise resources 124; as well as added, removed, and modified parameters of policies 114, profiles 116, baselines 118, sensors 120, scripts 122, and enterprise resources 124. The management service 142 can display the differences within the console user interface for an administrator. The management service 142 can also use these differences to generate and provide executable instructions for automated test-type environments 145 and manual instructions including text, image, audio, and video instructions for manual test environments 145.

At step 515, the management service 142 can determine whether the management configuration 113 includes environment-specific attributes or parameters. For example, management configurations 113 can include policies 114, profiles 116, baselines 118, sensors 120, scripts 122, and enterprise resources 124 that utilize environment-specific resources, data stores, data locations, network names and passwords, and so on. As a result, the management configuration 113 designed for the source environment 145 may not operate properly for another environment 145 specified in the management configuration delivery workflow 140. The management service 142 can include instructions and an environment-specific attribute mapping such as a table or another data structure that enables the management service 142 to identify and translate environment-specific attributes of the management configuration delivery workflow 140. If the management configuration delivery workflow 140 includes environment-specific attributes, the process can move to step 518. Otherwise the process can move to step 521.

At step 518, the management service 142 can translate environment-specific attributes of the management configuration delivery workflow 140. The management service 142 can identify an environment-specific attribute, and can use the environment-specific attribute mapping to identify a environment-specific value that corresponds to that environment-specific attribute and the destination environment 145. The management service 142 can then update the management configurations 113 to include the identified value for the environment-specific attribute and corresponding to the destination environment 145.

At step 521, the management service 142 can transmit the management configuration 113 to the destination environment 145 according to the management configuration delivery workflow 140. If the destination environment 145 is a test environment, the management service 142 can provide the management configuration 113 along with manual or executable instructions to perform a test and report results of the test to the management service 142. The management service 142 can update the management console as the management configuration delivery workflow 140 progresses.

The management service 142 can generate and transmit a request to transmit and install or store the management configuration 113 to the destination environment 145 using the environment endpoint 134, API credentials 136, and environment API key 138 of the destination environment 145. The management service 142 can identify and extract these items from the management configuration delivery workflow 140. The destination environment 145 can authorize a request to transmit and install the management configuration 113 based on the API credentials 136, and environment API key 138. The management service 142 can include the environment API key 138 in an authorization header for the request.

At step 524, the management service 142 can determine whether to roll back the management configuration 113 and actions performed for a particular node of the management configuration delivery workflow 140. For example, the particular node or step can be associated with a specific or global timeout threshold. If an elapsed time passes the timeout threshold without successful completion of the node, the management service 142 can roll back the node of the management configuration delivery workflow 140. The management service 142 can also provide a user interface element in the management console that a user can manipulate to roll back the node of the management configuration delivery workflow 140. If a roll back is to be performed, the management service 142 can roll back and revert the particular node of the management configuration delivery workflow 140, including reinstalling a previous management configuration 113 in some examples. Otherwise, the process can move to step 527.

At step 527, the management service 142 can determine whether the management configuration delivery workflow 140 includes additional destination environments 145. If additional tests, production, or other environments are specified, then the management service 142 can identify the next destination environment(s) 145 specified in the next node of the management configuration delivery workflow 140, and can move to step 521. Moving to the next node can depend on successful completion of the current node of the management configuration delivery workflow 140. Execution of the next node can also depend on identification of a user indication to execute that node. The management service 142 can provide notifications for updated completion statuses of each node, including notifications of initiation, progress, and success/failure of the node.

Although the management service 142 and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show examples of the functionality and operation of various implementations of portions of components described in this application. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

The invention claimed is:

1. A system, comprising:
   at least one computing device comprising at least one processor;
   machine readable instructions stored in at least one memory, wherein the machine readable instructions, when executed by the at least one processor, cause the at least one computing device to at least:
   identify, by a management service, a management configuration delivery workflow that specifies a plurality of computing environments comprising: a source environment, and at least one destination environment;
   generate, by the management service, a management console user interface that shows a graphical representation of the management configuration delivery workflow comprising a plurality of nodes corresponding to the plurality of computing environments;
   retrieve, by the management service, a management configuration from the source environment specified in the management configuration delivery workflow;
   transmit, by the management service, the management configuration to a destination environment specified in the management configuration delivery workflow; and
   update, by the management service, the management console user interface based on a completion status of a respective one of the nodes.

2. The system of claim 1, wherein the machine readable instructions, when executed by the at least one processor, cause the at least one computing device to at least:
   identify, by the management service, an environment-specific attribute of the management configuration, wherein a value for the environment-specific attribute corresponds to the source environment; and
   update, by the management service, the management configuration to include an updated value for the environment-specific attribute, wherein the updated value corresponds to the destination environment.

3. The system of claim 1, wherein the machine readable instructions, when executed by the at least one processor, cause the at least one computing device to at least:
   identify, by the management service, at least one difference between the management configuration and a previous management configuration.

4. The system of claim 3, wherein the machine readable instructions, when executed by the at least one processor, cause the at least one computing device to at least:
   generate, by the management service, an update for the management configuration delivery workflow based on the at least one difference between the management configuration and the previous management configuration.

5. The system of claim 3, wherein the machine readable instructions, when executed by the at least one processor, cause the at least one computing device to at least:
   visually emphasize, by the management service, the at least one difference within a configuration information user interface area of the management console user interface.

6. The system of claim 3, wherein the machine readable instructions, when executed by the at least one processor, cause the at least one computing device to at least:
   identify, by the management service, instructions to test the management configuration based on the at least one difference wherein the management configuration is provided to the destination environment along with the instructions to test the management configuration.

7. The system of claim 1, wherein the management configuration comprises at least one of: a policy, a profile, a baseline, a sensor, a script, and an enterprise resource.

8. A method, comprising:
   identifying, by a management service, a management configuration delivery workflow that specifies a plurality of computing environments comprising: a source environment, and at least one destination environment;
   generating, by the management service, a management console user interface that shows a graphical representation of the management configuration delivery workflow comprising a plurality of nodes corresponding to the plurality of computing environments;
   retrieving, by the management service, a management configuration from the source environment specified in the management configuration delivery workflow;
   transmitting, by the management service, the management configuration to a destination environment specified in the management configuration delivery workflow; and
   updating, by the management service, the management console user interface based on a completion status of a respective one of the nodes.

9. The method of claim 8, further comprising:
   identifying, by the management service, an environment-specific attribute of the management configuration, wherein a value for the environment-specific attribute corresponds to the source environment; and
   updating, by the management service, the management configuration to include an updated value for the environment-specific attribute, wherein the updated value corresponds to the destination environment.

10. The method of claim 8, further comprising:
    identifying, by the management service, at least one difference between the management configuration and a previous management configuration.

11. The method of claim 10, further comprising:
    generating, by the management service, an update for the management configuration delivery workflow based on the at least one difference between the management configuration and the previous management configuration.

12. The method of claim 10, further comprising:
    visually emphasizing, by the management service, the at least one difference within a configuration information user interface area of the management console user interface.

13. The method of claim 10, further comprising:
    identifying, by the management service, instructions to test the management configuration based on the at least one difference wherein the management configuration is provided to the destination environment along with the instructions to test the management configuration.

14. The method of claim 8, wherein the management configuration comprises at least one of: a policy, a profile, a baseline, a sensor, a script, and an enterprise resource.

15. A non-transitory computer-readable medium comprising machine readable instructions, wherein the machine readable instructions, when executed by at least one processor, cause at least one computing device to at least:

identify, by a management service, a management configuration delivery workflow that specifies a plurality of computing environments comprising: a source environment, and at least one destination environment;

generate, by the management service, a management console user interface that shows a graphical representation of the management configuration delivery workflow comprising a plurality of nodes corresponding to the plurality of computing environments;

retrieve, by the management service, a management configuration from the source environment specified in the management configuration delivery workflow;

transmit, by the management service, the management configuration to a destination environment specified in the management configuration delivery workflow; and update, by the management service, the management console user interface based on a completion status of a respective one of the nodes.

16. The non-transitory computer-readable medium of claim 15, further comprising:

identify, by the management service, an environment-specific attribute of the management configuration, wherein a value for the environment-specific attribute corresponds to the source environment; and updating, by the management service, the management configuration to include an updated value for the environment-specific attribute, wherein the updated value corresponds to the destination environment.

17. The non-transitory computer-readable medium of claim 15, further comprising:

identify, by the management service, at least one difference between the management configuration and a previous management configuration.

18. The non-transitory computer-readable medium of claim 17, further comprising:

generate, by the management service, an update for the management configuration delivery workflow based on the at least one difference between the management configuration and the previous management configuration.

19. The non-transitory computer-readable medium of claim 17, further comprising:

visually emphasize, by the management service, the at least one difference within a configuration information user interface area of the management console user interface.

20. The non-transitory computer-readable medium of claim 17, further comprising:

identify, by the management service, instructions to test the management configuration based on the at least one difference wherein the management configuration is provided to the destination environment along with the instructions to test the management configuration.

* * * * *